Patented Oct. 28, 1952

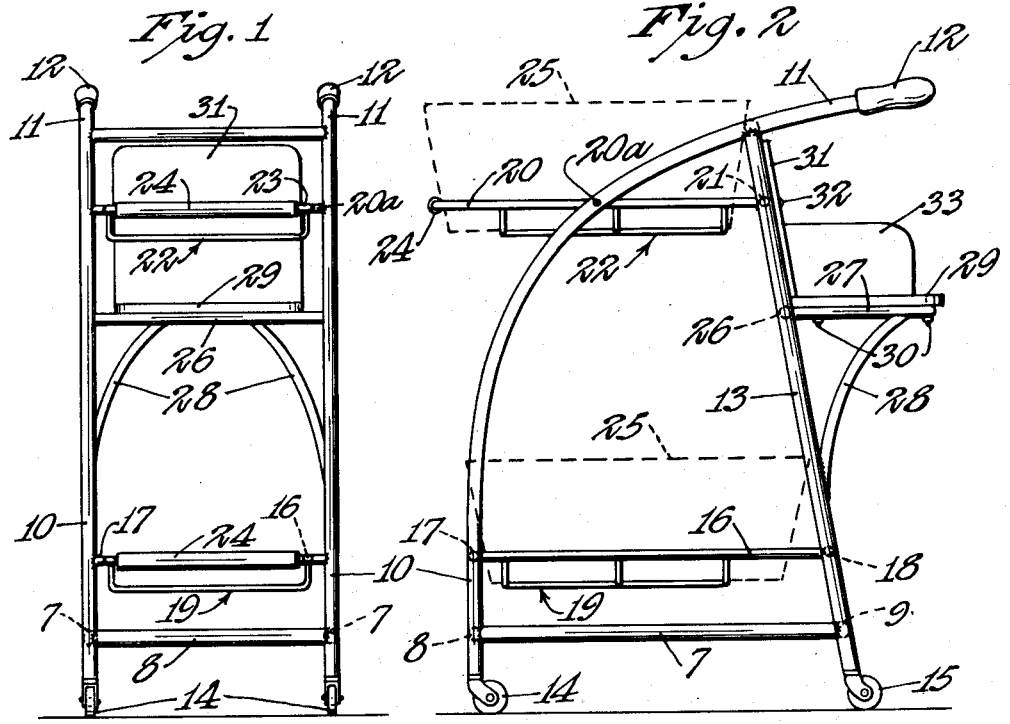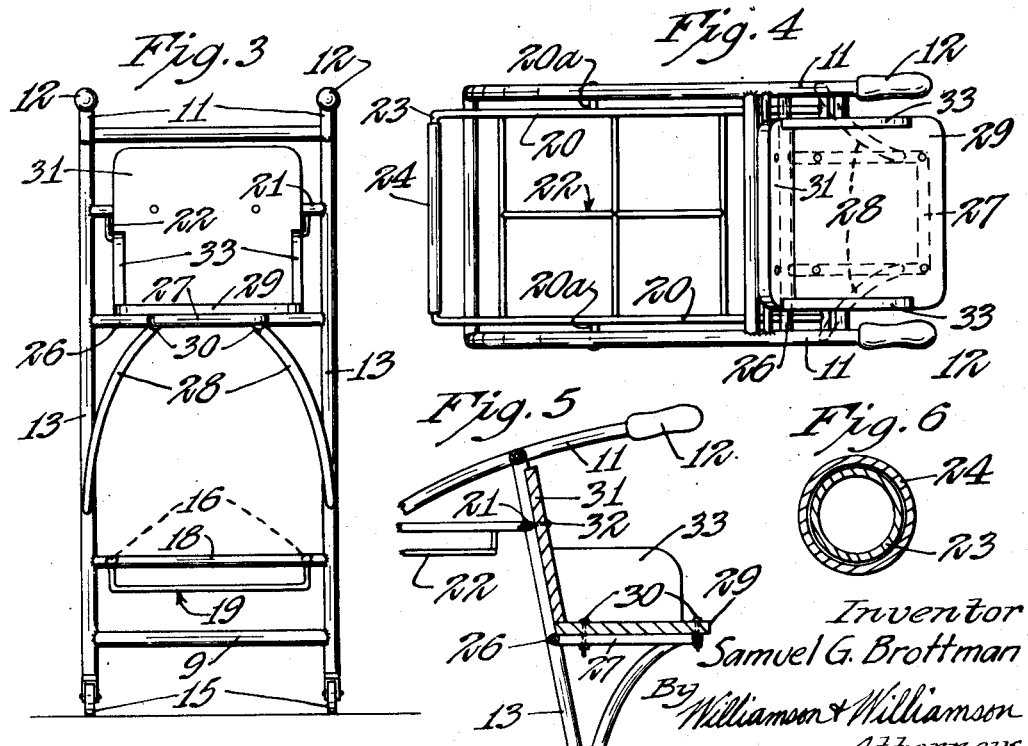

2,615,726

UNITED STATES PATENT OFFICE 2,615,726

SHOPPING CART

Samuel G. Brottman, Minneapolis, Minn.

Application February 7, 1947, Serial No. 727,158

5 Claims. (Cl. 280—47)

This invention relates to shopping carts such as are customarily used in large groceries and markets.

It is an object of the invention to provide a shopping cart which is adapted to carry one or more parcel receiving baskets, the cart being adapted for shopping around the store from one part of the store to another, wherein means is provided for safely and conveniently holding a small child on the cart while its parent is shopping and for supporting it in such a manner that it will not interfere with the parcel carrying capacity of the cart.

Another object of the invention is to provide a shopping cart structure of relatively simple yet strong and attractive characteristics in combination with means for conveniently supporting parcel receiving baskets or the like.

More specifically it is an object of the invention to provide a shopping cart having front and rear frame units wherein the front frame unit includes a pair of laterally spaced members extending upwardly and thence rearwardly to connect with the upper portion of the rear frame unit and wherein said front frame members are further extended rearwardly beyond the rear frame unit to provide handles by means of which the cart is pushed and steered, the handles also providing side members or arms for a child's seat located on the rear frame member.

Still a further object of the invention is to provide means on a shopping cart for facilitating the removal of heavily loaded parcel baskets therefrom.

The above and other objects and advantages of the invention will more fully appear from the following description made in connection with the accompanying drawings, wherein like reference characters refer to the same parts throughout the views, and, in which:

Figure 1 is a front elevational view of a cart embodying the invention;

Figure 2 is a side elevational view showing the parcel receiving baskets in dotted lines;

Figure 3 is a rear elevational view;

Figure 4 is a top plan view;

Figure 5 is a fragmentary longitudinal sectional view principally through the child's seat portion; and Figure 6 is an enlarged transverse sectional view through one of the rotary bearing elements mounted on the forward basket receiving supports.

The frame of the device includes a pair of lower side members 7 and a pair of front and rear cross members 8 and 9. The front cross member 8 and the forward end of the side members 7 are connected adjacent the lower ends of a pair of front frame uprights 10 which, as shown best in Figure 2, extend generally vertically for some distance and then curve upwardly and rearwardly to provide rearward extensions 11 having handles 12 thereon. There is a generally vertical rear frame unit including a pair of laterally spaced uprights 13 which, as shown in Figure 2, slant forwardly as from their lower ends. The upper ends of the rear frame unit uprights 13 are connected to the rearward extensions 11 of the forward frame unit uprights 10. The front frame uprights 10 are provided with rollers 14 and the rear frame uprights 13 are provided at their lower ends with rollers 15. These may be of any suitable type but in the customary shopping cart the rear rollers 15 would be of the caster type. It should be noted that practically all of the rear frame unit upright members 13 lie forwardly of the rollers 15.

A short distance above the lower frame side members 7 are laterally spaced side bars 16 which extend between a front cross member 17 which connects the front frame members 10 and a second cross member 18 which extends between the rear frame unit uprights 13. A conventional basket supporting grill 19 is suitably suspended between the bars 16.

At the upper portion of the cart there is a pair of laterally spaced bars 20 whose rear ends are connected to a cross member 21 extending between upper portions of the spaced rear frame uprights 13 and intermediate the ends of the bars 20 they are connected by short elements 20a to oppositely disposed portions of the front frame members 10 at a point where they begin to extend more toward the rear. The connections 20a are best shown in Figure 4. A basket supporting grill 22 similar to the grill 19 is supported between the spaced parallel bars 20. On the cross member 17 and a cross member 23 which latter member connects the forward ends of the bars 20 are rotatable sleeves 24. In Figure 6 the cross member 23 which connects the upper parallel bars 20 is shown in section with its rotary sleeves 24 loosely mounted thereon. Said rotary sleeves 24 assist in removing the parcel baskets 25 indicated in dotted lines in Figure 2 since then either basket can have its forward end pulled up on the rotary sleeve and the basket can then be slid out of its supporting grill 19 or 22 even though it is relatively heavily loaded.

Intermediate the ends of the rear frame unit 13 is another cross member 26 and extending rearwardly therefrom in a generally horizontal plane is a U-shaped auxiliary frame 27 which is braced by generally arcuate braces 28 extending from outwardly disposed portions of the subframe 27 to the rear frame uprights 13 some distance below the cross member 26. A seat bottom 29 is suitably secured to the U-shaped horizontal subframe 27 by means of nutted bolts 30. Extending upwardly from the seat bottom 29 is a seat back 31 which is secured by nutted bolts 32 to the cross member 21 above the cross member 26. The seat structure includes a pair of side boards 33.

It should be noted that the seat bottom 27 lies approximately symmetrically above the rear rollers 15. The forward slanting of the upright rear frame unit members 13 shifts the weight of the seat and its occupant somewhat forwardly so that there is no tendency for a child to overbalance the cart rearwardly when the baskets 25 are empty. This is an important safety feature in a device of this type where the user of the cart cannot always devote all of his attention to a child sitting in the seat.

Attention is called to the rearward extension 11 of the forward frame unit members 10. These rearwardly extending portions of the forward frame member 10 not only serve as spaced handles by means of which the cart can be pushed and steered, but they serve as added protection against the child falling sideways from the seat. Obviously, a suitable restraining strap can be placed between the rear upper portions of the seat sides 33 to prevent the child from slipping out of the seat.

It will, of course, be understood that various changes may be made in the form, details, arrangement and proportions of the various parts without departing from the scope of my invention.

What I claim is:

1. In a shopping cart, a frame including upwardly extending front and rear units having rollers on their lower ends, a generally horizontal basket support carried by said frame, a rearwardly facing seat fixedly connected to and supported rearwardly from said rear frame unit above said rollers and below said basket support, and that portion of said rear frame unit to which said seat is connected being disposed forwardly of the rollers on said rear frame unit.

2. In a shopping cart, a frame including upwardly extending front and rear units having rollers on their lower ends, a generally horizontal basket support carried by said front and rear frame units and having a major portion thereof disposed lengthwise above and between the rollers of said front and said rear frame units, said rear frame unit having a seat connecting portion above its rollers and forwardly of said last named rollers, and a rearwardly facing seat fixedly connected by its bottom to said seat connecting portion of said rear frame unit, said seat having a back portion disposed forward of a vertical line extending through the rollers on said rear frame unit whereby the bulk of the weight of a child carried upon said seat is brought to bear forwardly of said vertical line to preclude upsetting the cart.

3. In a shopping cart, a frame having upwardly extending front and rear frame units, a rearwardly facing seat fixedly mounted on and extending rearwardly from said rear frame unit, laterally spaced portions of said frame extending from the upper end portions of said front frame unit rearwardly to connect directly with laterally spaced end portions of said rear frame unit and thence rearwardly of said rear frame unit at the sides of said seat, the extreme rear ends of the rearwardly extending frame portions providing handles.

4. In a shopping cart, a frame having upwardly extending front and rear frame units in non-crossing relationship, a seat fixedly mounted on and extending rearwardly from said rear frame unit, said front frame unit having laterally spaced upper rearward end extensions connecting directly with and extending rearwardly beyond said rear frame unit, the rearward end extensions of said front frame unit lying at the sides of said seat to provide arms therefor, and the extreme rear ends of said rear end extensions of said front frame unit providing handles.

5. In a shopping cart, a frame including upright front and rear units, rollers at opposite sides of lower ends thereof, a basket supported generally horizontally by the upright front and rear units and having a major portion thereof disposed lengthwise above and between the rollers of the said upright front and rear frame units, the upright rear frame unit having a seat-carrying portion disposed above its rollers and which is wholly forwardly of the last mentioned rollers, and a seat fixedly connected to the seat-carrying portion of the upright rear frame unit rearwardly thereof, said seat having a back portion disposed forwardly of a vertical line extending through axes of the rollers on the upright rear frame unit whereby the bulk of the weight of a child occupying the seat is caused to bear forwardly of the said vertical line and preclude upsetting of the cart.

SAMUEL G. BROTTMAN.

REFERENCES CITED

The following references are of record in the file of this patent:

UNITED STATES PATENTS

| Number | Name | Date |
|---|---|---|
| D. 148,128 | Brottman | Dec. 23, 1947 |
| 1,353,180 | Preston et al. | Sept. 21, 1920 |
| 1,409,331 | Bestimt | Mar. 14, 1922 |
| 2,181,892 | Head | Dec. 5, 1939 |
| 2,192,102 | Pinto | Feb. 27, 1940 |
| 2,234,358 | Schray | Mar. 11, 1941 |
| 2,398,863 | Sides | Apr. 23, 1946 |
| 2,438,829 | Skolnik | Mar. 30, 1948 |

FOREIGN PATENTS

| Number | Country | Date |
|---|---|---|
| 480,939 | Great Britain | Mar. 2, 1938 |